Feb. 27, 1962 J. M. LAZAR 3,023,013
ROTARY SHAFT SEALING MEANS
Filed Nov. 3, 1958 2 Sheets-Sheet 1

INVENTOR.
JOHN M. LAZAR
BY Cullen & Canton
ATTORNEYS

Feb. 27, 1962 J. M. LAZAR 3,023,013
ROTARY SHAFT SEALING MEANS
Filed Nov. 3, 1958 2 Sheets-Sheet 2

INVENTOR.
JOHN M. LAZAR
BY
Cullen & Cantor
ATTORNEYS

United States Patent Office 3,023,013
Patented Feb. 27, 1962

3,023,013
ROTARY SHAFT SEALING MEANS
John M. Lazar, 6540 E. Palmer, Detroit, Mich.
Filed Nov. 3, 1958, Ser. No. 771,597
1 Claim. (Cl. 277—41)

This invention relates to a rotary shaft sealing means, and more particularly to a unitary means adapted to seal a rotary shaft to a wall surface where the shaft extends through an opening in the wall surface.

It is an object of this invention to provide a sealing means, to seal a rotating shaft to a wall surface, through which the shaft extends, which seals so positively and securely, that even if the shaft wobbles, due to shaft misalinement or the like, the seal will not leak.

A further object of this invention is to form a seal formed of a retainer which supports all of the various sealing elements so that the seal may be handled as one integral unit, thus providing ease of handling, ease of use, reduction of expense of parts, and simplicity in operation.

Yet a further object of this invention is to provide a unitary seal which is not permanently or rigidly attached to either the shaft or the wall and which requires no alteration or machining of the shaft, but which may be easily applied thereto or removed therefrom.

These and other objects and advantages of this invention will become apparent upon reading the following description of which the attached drawings form a part.

With reference to the attached drawings, in which.

Figure 1:
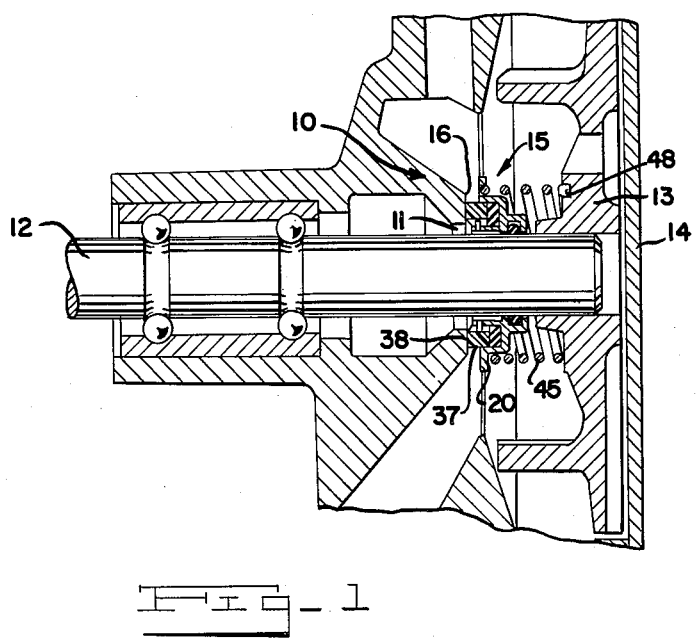
FIG. 1 is a fragmentary view, in cross-section, of the sealing means assembled upon a shaft which extends outwardly through the wall of a housing.
Figure 2:
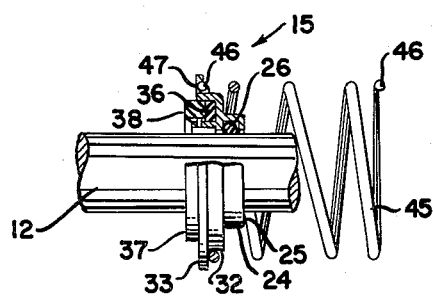
FIG. 2 shows the sealing means, per se, partially in cross-section, and mounted upon a fragment of the shaft, with the coil spring being non-compressed.

For illustration purposes, FIG. 1 shows a fragment of a pump, used for pumping water, having housing wall 10 with an opening 11 formed therein through which a pump shaft 12 extends. The end of the shaft carries an impeller 13 which is rigidly mounted on the shaft by a press fit or the like. A cover 14 covers the outside of the housing. The housing is not shown in any great detail nor is it specifically described, since it forms no part of this invention, but is used merely to illustrate the relationship of the seal to the shaft and wall.

It is desirable to prevent the leakage of any fluid through the opening 11 around the shaft, and therefore a sealing means 15 is provided which seals against the shaft and also seals against the wall portion 16, which forms the periphery of the opening 11. The wall portion 16 is substantially transverse of the axis of the shaft.

Figure 3:
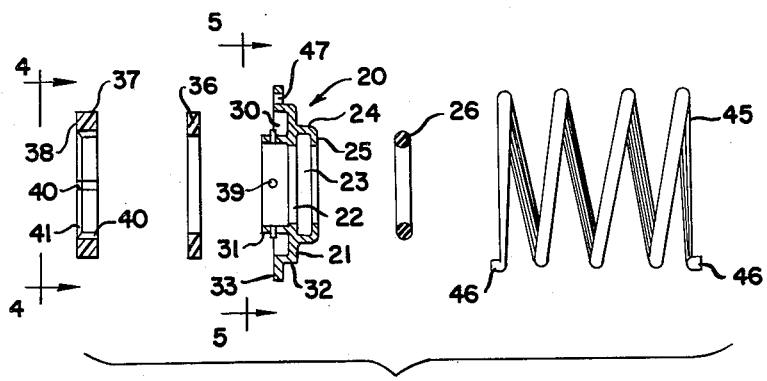
FIG. 3 is a disassembled view of the sealing means and shows all the parts comprising the sealing means.
Figure 4:
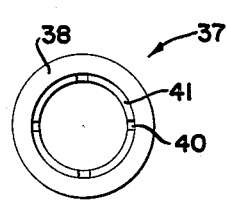
FIG. 4 is a view of the sealing nose, taken on arrows 4—4 of FIG. 3.
Figure 5:
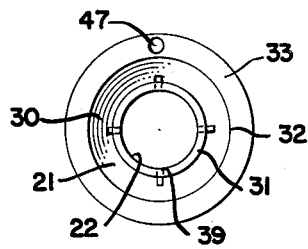
FIG. 5 is a view of the retainer, taken in the direction of arrows 5—5 of FIG. 3.

The sealing means comprises a retainer 20 (see FIG. 3). The retainer is formed of a disk shaped center section 21 which is centrally apertured at 22 for loosely sliding over the shaft to be sealed.

On one face of the disk 21 a radially directed, inwardly opening, channel 23 is formed by means of an annular flange 24 integral with and extending normal to the disk and having its end 25 bent parallel to the disk. This channel 23 is used for carrying a resilient sealing ring 26 which extends out of the channel a sufficient distance to tightly press against the shaft upon which the retainer is mounted. The sealing ring may be made of any suitable resilient material, such as rubber or the like.

The opposite face of the disk is provided with a channel 30 which is axially directed and preferably is formed of a pair of annular flanges 31 and 32 which are integral with the disk. Flange 31 is adjacent the periphery of the aperture; flange 32 is adjacent the periphery of the disk and terminates in a continuous annular shoulder 33. A resilient washer 36, which may be formed of rubber or the like, and a sealing nose 37 fit within channel 30. The sealing nose is preferably made of a material which has a low coefficient of friction and which is substantially rigid, rather than resilient as in the case of the washer, and whose sealing face 38 is flat and smoothly finished for reduced friction and for better sealing qualities in rubbing against the wall surface 16.

The sealing nose is held against relative movement with the retainer by means of radially, outwardly directed pins 39 secured to the retainer. The pins fit into channels 40 cut into the inside surface of the sealing nose. Alternatively, the pins and channels could be reversed, with the channels formed in the retainer and pins or extensions formed on the sealing nose.

Also, note that the sealing nose is chamfered at 41, so as to avoid catching on any burrs or the like which may be formed on the wall 16.

The sealing retainer, sealing ring, resilient washer, and sealing nose all stay together as one unit. Because of the integral construction of the sealing retainer, the unit has a short axial dimension relative to its diameter. For example, one sample made up which has an overall outside diameter of one and one-half inches was approximately .45 inch in axial dimension.

The sealing ring 26 tightly seals the retainer to the rotating shaft regardless of any possible wabbling motion of the shaft. The sealing nose 37 is pressed against the wall surface 16 by means of resilient urging of a coil spring 45 which is of a size to surround the shaft and the retainer. One end of the spring is abutted against the shoulder 33 of the retainer; the opposite end is abutted against a stop which in this case is the impeller 13. Note, that it is desirable to bend the ends 46 of the coil spring so that they fit into an opening 47 in the retainer shoulder, and an opening 48 in the impeller to thereby prevent twisting or rotation of the coil spring and of the seal relative to the shaft.

With this construction, the seal automatically compensates for wear on the sealing nose to maintain a leakproof seal even though the sealing nose becomes worn to some extent due to operation.

This invention may be developed further within the scope of the following attached claim. Accordingly, it is desired that the foregoing description be read as being merely illustrative of an operative embodiment of this invention and not in a strictly limiting sense.

I claim:

A rotary shaft sealing means comprising a one-piece retainer in the form of a disk having a front face and a rear face and having a central axis and an axially aligned central aperture through which a shaft may be loosely inserted, and having a radially directed channel formed on the rear face of the disk and an axially directed channel formed on the front face of the disk; the radially directed channel being formed of an annular flange integral with and extending normally to said rear face of the disk and with the outer end of the flange being extended radially inwardly substantially parallel to the disk, to form a single radially inwardly opening channel defined by the disk rear face, the flange, and the outer end of the flange; the axially directed channel being formed by a pair of annular flanges integral with and extending normal to the front face of the disk, with one of the pair of flanges being an inner flange arranged closely adjacent to and surrounding the periphery of the central aperture and being closer to the disk central axis than said radially directed channel annular flange, and with the other of the pair of flanges being an outer flange formed on the outer periphery of the disk and being considerably further from the disk central axis than said radially directed channel annular flange, thus forming an axially directed channel defined by the pair of flanges and the disk front face, and the end of said outer flange being formed into a radially, outwardly extending shoulder arranged in a plane located at the opening of the axially directed channel and spaced axially a considerable distance from the disk and the radially directed channel; a resilient ring fitted into the radially directed channel for sealing against a shaft fitted through said central aperture, and acting as a fulcrum, relative to the shaft, about which the retainer may pivot, and a ring shaped sealing means in the form of a resilient backing ring and a substantially non-resilient sealing ring, both axially aligned and both fitted in the axially directed channel and radially confined between the pair of flanges, with the sealing ring extending axially outwardly thereof and having an end face for pressing and sealing against a wall arranged transverse to and surrounding the shaft, the backing ring being formed to resiliently yield in response to wabbling of the seal, to hold the end face of the sealing ring in full face to face contact with the wall, and a coil spring arranged co-axial with the disk and having one of its ends in contact with said shoulder, the spring being positioned to spring force the retainer and therefore the sealing ring end face towards the wall, with the spring force being applied only to the outermost periphery of the retainer, namely to the outer flange, and at a considerable axial distance from the radially directed channel and its sealing ring.

References Cited in the file of this patent
UNITED STATES PATENTS

| | | |
|---|---|---|
| 2,233,599 | Gilbert | Mar. 4, 1941 |
| 2,433,589 | Adams | Dec. 30, 1947 |
| 2,479,711 | Arutunoff | Aug. 23, 1949 |
| 2,499,353 | Brummer | Mar. 7, 1950 |
| 2,501,984 | Alward | Mar. 28, 1950 |
| 2,592,728 | Payne | Apr. 15, 1952 |